US008171719B2

(12) United States Patent
Ryan

(10) Patent No.: US 8,171,719 B2
(45) Date of Patent: May 8, 2012

(54) IGNITER ASSEMBLY FOR A GAS TURBINE

(75) Inventor: William R. Ryan, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 909 days.

(21) Appl. No.: 12/052,820

(22) Filed: Mar. 21, 2008

(65) Prior Publication Data

US 2009/0235635 A1 Sep. 24, 2009

(51) Int. Cl.
*F02C 7/264* (2006.01)

(52) U.S. Cl. ........... 60/39.821; 60/799; 60/796; 60/800; 60/39.827

(58) Field of Classification Search ............... 60/39.821, 60/799, 39.827, 800, 796
See application file for complete search history.

(56) References Cited

U.S. PATENT DOCUMENTS 3,910,036 A * 10/1975 Irwin .............................. 60/753
4,275,559 A 6/1981 Blair
4,430,978 A 2/1984 Lewis et al.
4,903,476 A 2/1990 Steber et al.
5,402,637 A 4/1995 Adam
5,765,833 A 6/1998 Able et al.
6,382,159 B1 * 5/2002 Shifflette .................. 123/169 V
6,425,240 B1 7/2002 Park
6,438,940 B1 8/2002 Vacek et al.
6,442,929 B1 * 9/2002 Kraft et al. ................. 60/39.827
6,662,564 B2 12/2003 Bruck et al.
6,748,735 B2 * 6/2004 Schmotolocha et al. .. 60/39.826
6,920,762 B2 * 7/2005 Wells et al. ..................... 60/799
7,080,513 B2 7/2006 Reichert

* cited by examiner

*Primary Examiner* — William H Rodriguez
*Assistant Examiner* — Steven Sutherland

(57) ABSTRACT

An igniter assembly (10) of a gas turbine (12) is presented, including an igniter (14) disposed within an igniter housing (16). The igniter is extendable from the igniter housing through an opening (18) in a combustion liner (19) to an extended position, and is retractable from the extended position back through the opening to a retracted position (22). The igniter assembly further includes a compressible assembly (24) disposed between a base (26) of the igniter housing and the combustion liner to form a sealed interface (15) with a perimeter (28) of the opening (18). The compressible assembly is configured to restrict an air flow from passing between the igniter housing base and the perimeter of the opening. The compressible assembly is variable in length to accommodate a respective variation in a separation between the igniter housing base (26) and the opening (18).

18 Claims, 4 Drawing Sheets

IGNITER ASSEMBLY FOR A GAS TURBINE

FIELD OF THE INVENTION

The present invention relates to gas turbines, and more particularly to an igniter assembly used in conjunction with a gas turbine.

BACKGROUND OF THE INVENTION

Several conventional igniter assemblies for gas turbines have been developed. FIG. 1 illustrates an example of such a conventional igniter assembly 110 used to control leakage of air flowing through an opening 118 within a combustion liner 119. As illustrated in FIG. 1, the conventional igniter assembly 110 provides an igniter boss 115 which extends from the perimeter of the opening 118 and encircles an igniter 114 to minimize an air flow into the igniter cavity and through the opening 118.

FIG. 2 illustrates another example of a conventional igniter assembly 210 to control leakage of air flowing through an opening 218 within a combustion liner 219. The conventional igniter assembly 210 provides an igniter 214 disposed within an igniter housing 216. An igniter boss 215 extends from the perimeter of the opening 218 to a base 226 of the igniter housing 216, to minimize the air flow into the igniter cavity and through the opening 218.

An additional example of a conventional igniter assembly is disclosed in U.S. Pat. No. 6,920,762 to Wells et al. As illustrated in FIG. 2 of Wells et al., an igniter assembly 38 provides an igniter 36 with a tip 44 that passes through an opening 47 in an outer casing 30, a pair of springs 42,52, a first ring 46 and an opening 40 in a combustion liner 16 adjacent to a combustion chamber 14. The igniter assembly 38 positions the igniter 36 between an outer casing 30 and the combustion liner 16 to maintain an alignment of the igniter 36 with respect to the combustion liner opening 40. Since the outer casing 30 has a greater thermal growth characteristic than the combustion liner 16, the outer casing 30 experiences thermal growth which exceeds that of the combustion liner 16. During such thermal growth, the outer casing 30 and igniter 36 slide in a radial direction relative to the combustion liner 16, and the springs 42,52 impart a predetermined load between the outer casing 30 and the liner 16 in order to maintain the alignment of the igniter 36 through the opening 40.

BRIEF DESCRIPTION OF THE DRAWINGS

The invention is explained in the following description in view of the drawings that show.

DETAILED DESCRIPTION OF THE INVENTION

Figure 1:
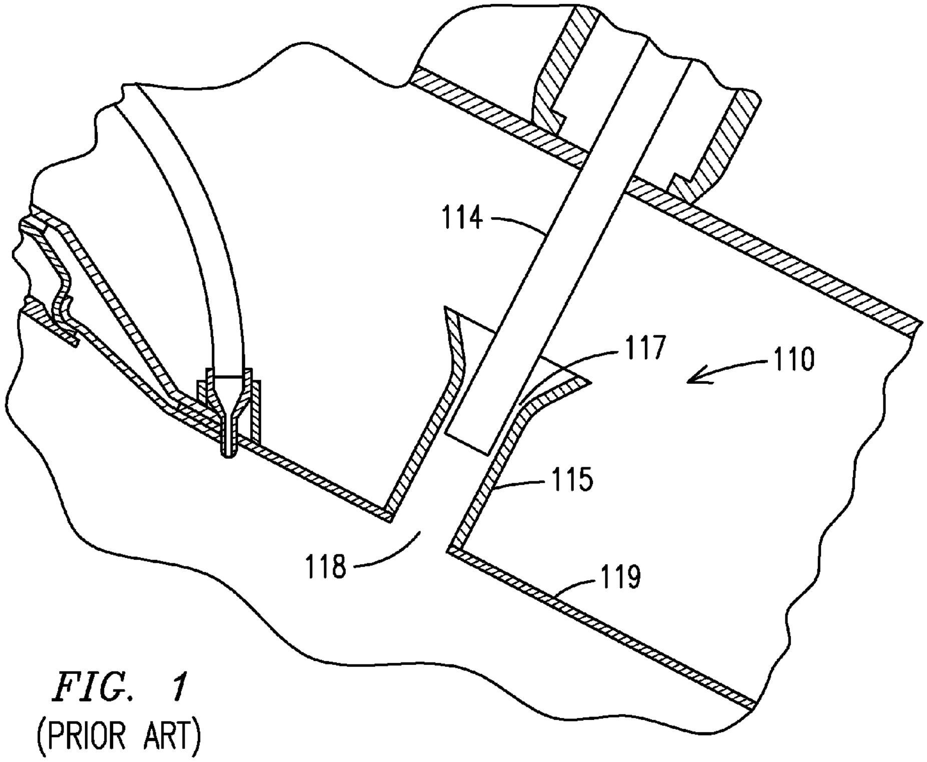
FIG. 1 is a sectional view of a conventional igniter assembly for a gas turbine.
Figure 2:
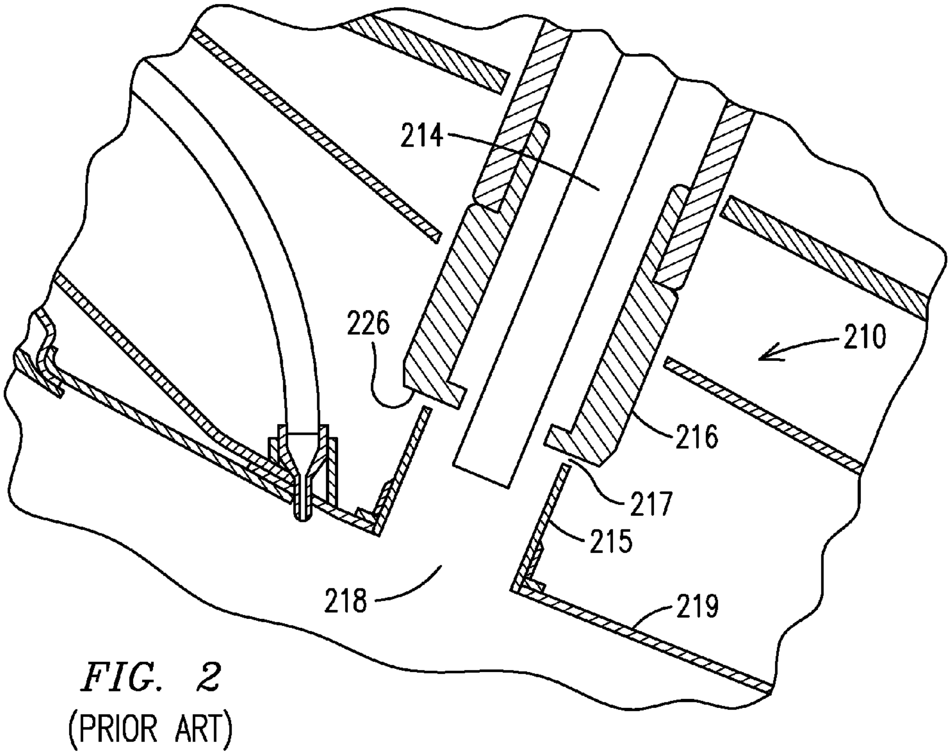
FIG. 2 is a sectional view of a conventional igniter assembly for a gas turbine.

The inventor has recognized that although the conventional igniter assembly 110 illustrated in FIG. 1 is designed to reduce an airflow passing through the opening 118 within the combustion liner 119, the positioning of the igniter boss 115 around the igniter 114 introduces a radial gap 117 between the igniter boss 115 and the igniter 114 to facilitate an undesired air flow to pass through the opening 118. Additionally, the inventor has recognized that although the conventional igniter assembly 210 illustrated in FIG. 2 is similarly designed to reduce an airflow passing through the opening 218 in the combustion liner 219, the positioning of the igniter boss 215 proximate to the igniter housing base 226 introduces an axial gap 217 between the igniter boss 215 and the igniter housing base 226 to facilitate an undesired air flow to pass through the opening 218. Thus, the inventor has recognized that there is a need to provide an igniter assembly with an air seal to eliminate radial gaps and axial gaps within the igniter assembly which facilitate the passage of an undesired air flow through the opening in the combustion liner.

The inventor has recognized that although the igniter assembly 38 of the Wells et al. patent provides an air seal for a radial gap 40 in the combustion liner 16, the air seal is limited to the igniter tip 44 being in an extended position beyond the combustion liner 16. The inventor has recognized that if the igniter tip 44 of the Wells et al. patent were to retract through the combustion liner 16, a noticeable undesired air flow would be generated through the opening 40 and into the combustion chamber 14. Accordingly, the inventor has developed an igniter assembly featuring an air seal which prevents an air flow from entering the opening of the combustion liner, regardless of whether the igniter is in a retracted position or an extended position with respect to the combustion liner.

Additionally, the inventor has recognized that even if the igniter tip 44 remains in the extended position beyond the combustion liner 16, the igniter assembly 38 provides no structure to prevent an air flow from passing through an axial gap in the igniter assembly 38 attributed to thermal growth properties in the axial direction of the outer casing 30 and the combustion liner 16. For example, the lone pair of springs 42, 52 surrounding the igniter do not provide an adequate air seal to prevent such an air flow. Accordingly, the inventor has developed an igniter assembly with an air seal having the appropriate structural features to prevent an air flow from passing through a respective radial gap or axial gap within the igniter assembly attributed to thermal expansion properties.

The inventors have additionally recognized that the pair of springs 42, 52 in Wells et al. are positioned within an open area of the igniter assembly 38, thereby posing a risk in the event that a portion of a spring 42,52 were to break away and fall through the opening 40 into the combustion chamber 14, or to interfere with the motion of the igniter 36. Accordingly, the inventor has developed an air seal featuring a spring which is captured within a stagnant volume, thereby reducing the risk posed by such a spring.

Figure 9:
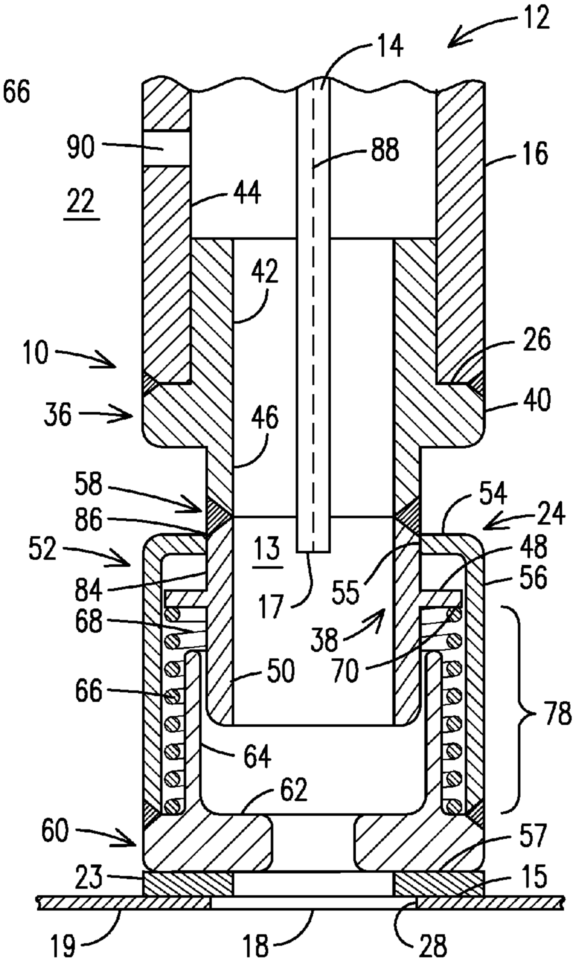
FIG. 9 is a sectional view of the exemplary embodiment of the igniter assembly of FIG. 8, where the base portion and the cover portion are welded together.

FIG. 9 illustrates an exemplary embodiment of an igniter assembly 10 of a gas turbine 12. The igniter assembly 10 includes an igniter 14 disposed within an igniter housing 16, which encircles the igniter 14. Although the exemplary embodiment of the igniter assembly 10 in FIG. 3 features a circular igniter housing 16 and other circular components encircling the igniter 14 and the igniter cavity 13, the igniter housing and the other components may be non-circular, polygon shaped components, for example. As illustrated in FIG. 9, the igniter tip 17 is positioned on a same side of a combustion liner 19 as the igniter housing 16. The igniter 14 is extendable from the igniter housing 16 through an opening 18 in the combustion liner 19 to an extended position (not shown) on an opposite side of the combustion liner 19 than the igniter housing 16. Subsequent to extending the igniter 14 through the opening 18 to the extended position, the igniter 14 is retractable from the extended position back through the opening 18 to a retracted position 22 (FIG. 9) where the igniter tip 17 is positioned on the same side of the combustion liner 19 as the igniter housing 16. The igniter assembly 10 of the present invention provides its notable advantageous features, including an air seal between the igniter housing 16 and the opening 18, when the igniter 14 is in the extended position, the retracted position, and all positions in between. However, an exemplary embodiment of the igniter assembly 10 may exclusively provide the advantageous features for one or more particular igniter positions, for example.

As illustrated in the exemplary embodiment of FIG. 9, the igniter assembly 10 further includes a compressible assembly 24 disposed between a base 26 of the igniter housing 16 and the combustion liner 19 to form a sealed interface 15 with a perimeter 28 of the opening 18 in the combustion liner 19. The compressible assembly 24 collectively restricts an air flow from passing between the igniter housing base 26 and the perimeter 28 of the opening 18. In an exemplary embodiment of the igniter assembly 10, the compressible assembly 24 is variable in length to accommodate a respective variation in a separation between the igniter housing base 26 and the opening 18 within the combustion liner 19. The structural features of an exemplary embodiment of the compressible assembly 24 are discussed in further detail below.

Figure 3:
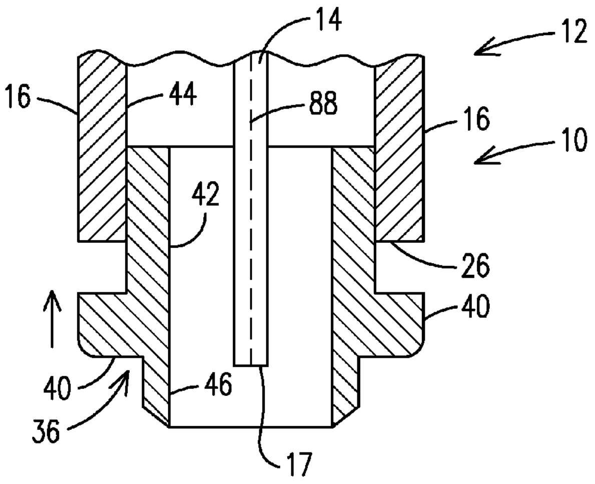
FIG. 3 is an exploded sectional view of an exemplary embodiment of an igniter housing, an igniter, and a top guide portion of an igniter assembly.
Figure 4:
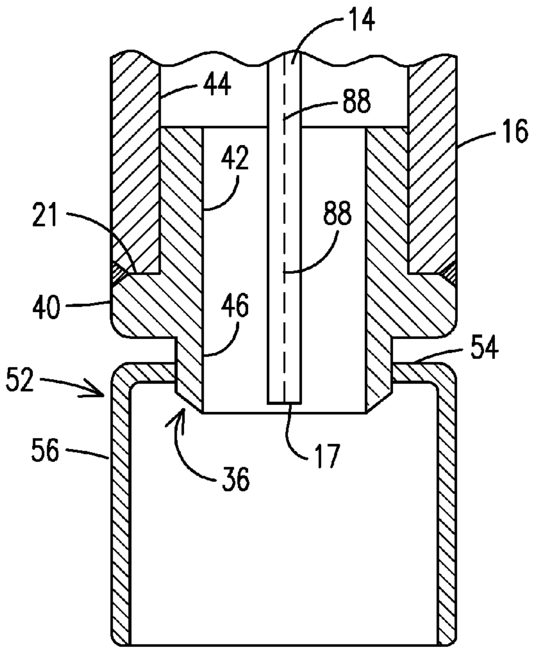
FIG. 4 is a sectional view of the exemplary embodiment of the igniter assembly of FIG. 3, including a cover portion of the igniter assembly.
Figure 5:
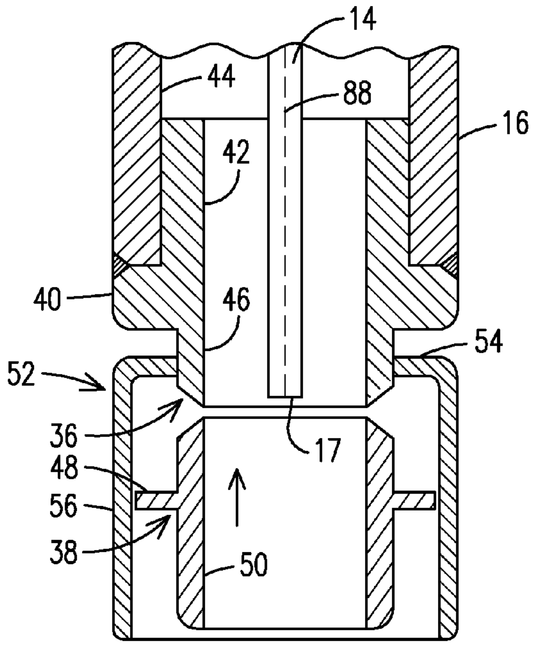
FIG. 5 is a sectional view of the exemplary embodiment of the igniter assembly of FIG. 4, including a bottom guide portion of an igniter housing.
Figure 6:
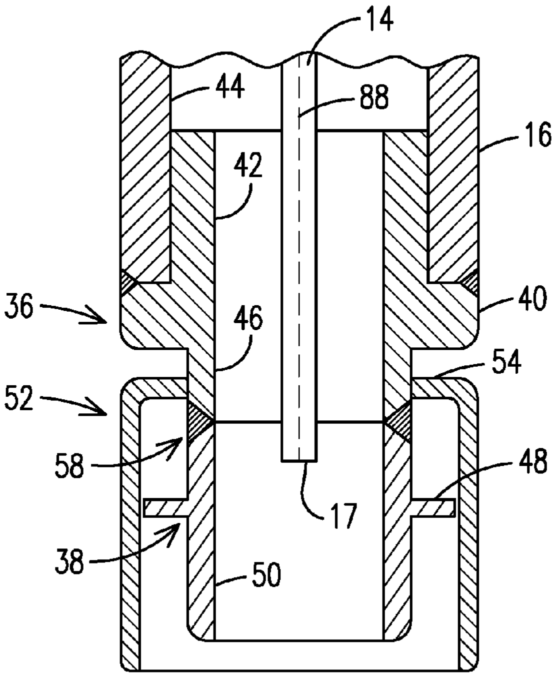
FIG. 6 is a sectional view of the exemplary embodiment of the igniter assembly of FIG. 5, where the top guide portion and bottom guide portion are welded together.
Figure 7:
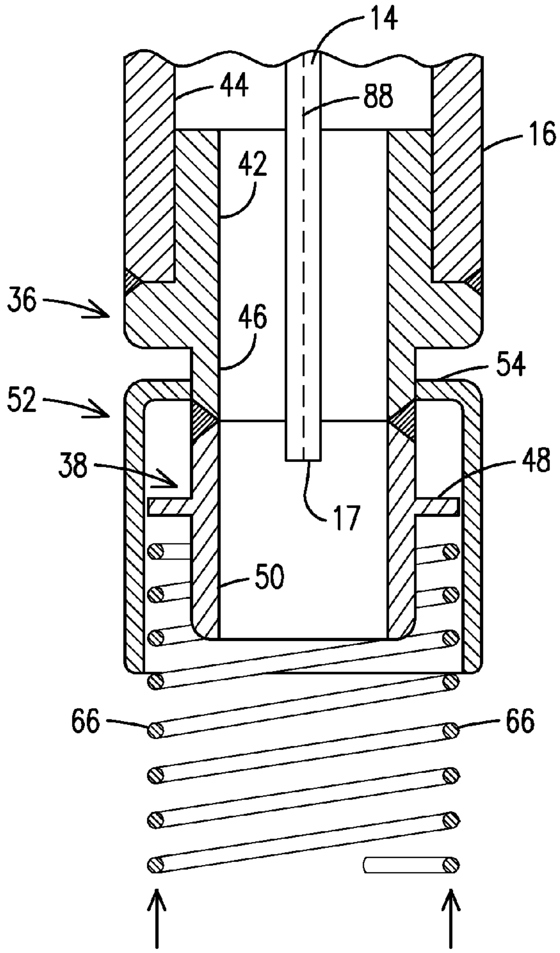
FIG. 7 is a sectional view of the exemplary embodiment of the igniter assembly of FIG. 6, including a spring of the igniter assembly.
Figure 8:
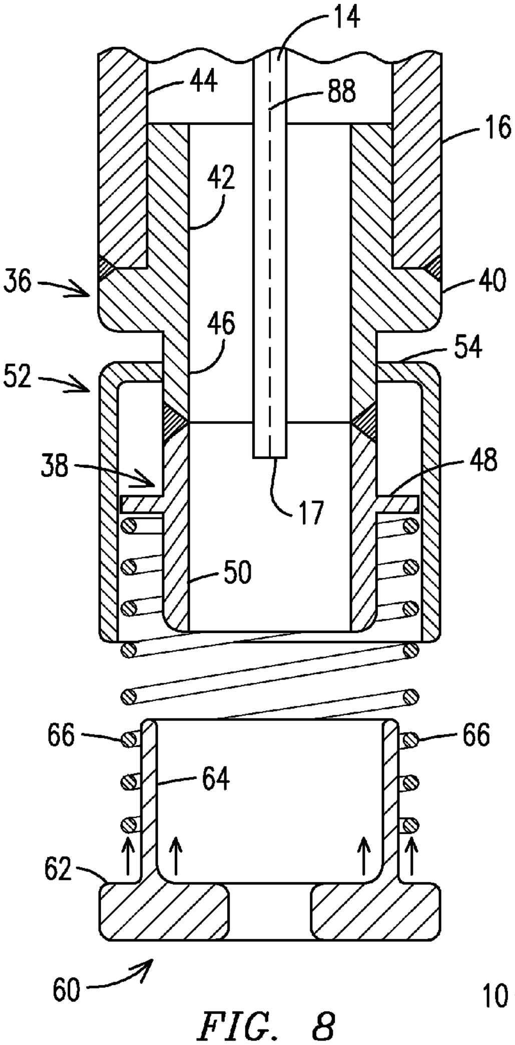
FIG. 8 is a sectional view of the exemplary embodiment of the igniter assembly of FIG. 7, including a base portion of the igniter assembly.

FIGS. 3-9 illustrate exemplary embodiments of the respective structural assembly steps for a compressible assembly 24 of the igniter assembly 10. FIG. 3 illustrates an exemplary embodiment of the igniter 14 encircled by the igniter housing 16, and a top guide portion 36 which is slid up around the igniter tip 17 and into contact with the igniter housing base 26 (FIG. 4). As illustrated in the exemplary embodiment of FIG. 3, the top guide portion 36 includes an outer flange 40 to form a sealed interface 21 with the igniter housing base 26 (FIG. 4), an upper longitudinal portion 42 slidably engaged with an inner portion 44 of the igniter housing 16, and a lower longitudinal portion 46. As illustrated in the exemplary embodiment of FIG. 4, once the top guide portion 36 forms the sealed interface 21 with the igniter housing base 26, and the upper longitudinal portion 42 is slidably engaged with the inner portion 44, a cover 52 is passed up around the lower longitudinal portion 46 of the top guide portion 36. As illustrated in FIG. 5, upon passing the cover 52 around the lower longitudinal portion 46 of the top guide portion 36, a bottom guide portion 38 is passed up inside the cover 52 and aligned with the top guide portion 36. The bottom guide portion 38 includes a spring flange 48 extending outwardly from a longitudinal portion 50. The top guide portion 36 and bottom guide portion 38 are welded together, as illustrated in FIG. 6, at opposing ends, where the respective opposing ends are slanted in opposite directions to accommodate the welding process, as appreciated by one of skill in the art. Upon welding the top guide portion 36 and bottom guide portion 38, the cover 52 includes an outer portion 56 (discussed below) and a top portion 54 which is slidably engaged with an outer surface 58 of the longitudinal portion 50 of the bottom guide portion 38 and the lower longitudinal portion 46 of the top guide portion 36. As illustrated in FIG. 7, a spring 66 is passed up into the cover 52 adjacent to an inner surface of the outer cover portion 56 and against the spring flange 48 of the bottom guide portion 38. As illustrated in FIG. 8, upon positioning the spring 66, a base 60 including a bottom portion 62 and a longitudinal portion 64 is passed upward, and the longitudinal portion 64 is passed into the cover 52 between the spring 66 and the longitudinal portion 50 of the bottom guide portion 38. The bottom portion 62 is subsequently welded to the bottom end of the longitudinal portion 56 of the cover 52 (FIG. 9), and the bottom portion 62 forms a sealed interface 57 with the opening 18. As illustrated in FIG. 9, the spring flange 48, the outer cover portion 56, the bottom base portion 62 and the longitudinal base portion 64 form a variable stagnant volume 68 in which the spring 66 is disposed to impart an upward force on the spring flange 48 such that the compressible assembly 24 forms an effective seal between the igniter housing base 26 and the opening 18.

Although FIGS. 3-9 illustrate an exemplary set of assembly steps for the exemplary embodiment of the compressible assembly 24 utilizing a particular set of components, these assembly steps may be rearranged or supplemented using the same components so to provide an additional exemplary embodiment of a compressible assembly. Additionally, the compressible assembly is not limited to the exemplary set of components illustrated in FIGS. 3-9, but may include any set of components which may be assembled using any set of steps, provided that the compressible assembly restricts an air flow from passing between the igniter housing base 26 and the perimeter 28 of the opening 18, and is variable in length to accommodate a respective variation in a separation between the igniter housing base 26 and the opening 18 within the combustion liner 19.

In the exemplary embodiment of the igniter assembly 10 illustrated in FIG. 9, the spring flange 48 contacts a top end 70 of the spring 66 disposed within the stagnant volume 68. A variation in the separation between the igniter housing 16 and the opening 18 causes the spring 66 to maintain an upward force on the spring flange 48 and vertically shift the spring flange 48 in the same relative shift direction as the igniter housing 16 during the separation variation. Thus, the spring flange 48 forms a variable top portion of the stagnant volume 68. Additionally, the longitudinal base portion 64 disposed between the spring 66 and the longitudinal portion 50 of the bottom guide portion 38 forms an inner portion of the stagnant volume 68. The stagnant volume 68 is further defined by the outer cover portion 56 positioned along an outer surface of the ring 66, which forms an outer portion of the stagnant volume 68. The bottom base portion 62 forms a bottom portion of the stagnant volume 68.

In an example of a variation in the separation between the igniter housing 16 and the opening 18, when the separation is minimized as illustrated in FIG. 9, the spring flange 48 imparts a downward force on the spring 66 and compresses the spring 66 to a compressed length 78 within the stagnant volume 68 such that the stagnant volume 68 is minimized. Additionally, as the spring flange 48 is lowered to compress the spring 66 within the stagnant volume 68, the top cover portion 54 slidably moves up and engages an upper portion 86 along the outer surface 58 of the longitudinal portion 50 and the lower longitudinal portion 46, as illustrated in FIG. 9.

From the minimal separation between the igniter housing 16 and the opening 18 illustrated in FIG. 9, the separation may be increased to a maximum separation (not shown), in which the downward force imparted on the spring 66 by the spring flange 48 is reduced, and the spring 66 varies in length to an uncompressed length (not shown). Additionally, as the spring flange 48 is raised to uncompress the spring 66 within the stagnant volume 68, the top cover portion 54 slidably moves down and engages a lower portion 84 along the outer surface 58 of the longitudinal portion 50 and the lower longitudinal portion 46, as illustrated in FIG. 9. Although FIG. 9 illustrates one spring 66 disposed within one stagnant volume 68, the present invention is not limited to this arrangement and may include multiple springs disposed within a single stagnant volume, or multiple springs disposed within respective multiple stagnant volumes. Additionally, the present invention may include the use of a non-spring compressible device disposed within the stagnant volume or within any portion of the compressible assembly, provided that the compressible device facilitates varying the compressible assembly length with the variance in the separation between the igniter housing and the opening in the combustion liner, and ensures that a sufficient minimal contact is maintained between the compressible assembly and the igniter housing and perimeter of the combustion liner opening, to maintain all sealed interfaces to prevent an undesired air flow from passing between the igniter housing and the combustion liner opening.

Regardless of the degree of separation between the igniter housing 16 and the opening 18, the top cover portion 54 forms a sealed interface 55 with the outer surface 58 to prevent air from passing between the top cover portion 54 and the top guide portion 36 or bottom guide portion 38, depending on the separation between the igniter housing 16 and the opening 18. For example, when the igniter housing 16 and the opening 18 are separated by the maximum separation, the top cover portion 54 slidably engages a lower portion 84 along the longitudinal portion 50 of the outer surface 58 and forms the sealed interface 55 between the top cover portion 54 and the longitudinal portion 50. Thus, for the maximum separation between the igniter housing 16 and the opening 18, the sealed interface 55 prevents an air flow from passing between the top cover portion 54 and the bottom guide portion 38. In another example, when the igniter housing 16 and the opening 18 are separated by a minimum separation, the top cover portion 54 slidably engages an upper portion 86 along the outer surface 58, and forms the sealed interface between the top cover portion 54 and the longitudinal portion 50. Thus, for a minimum separation between the igniter housing 16 and the opening 18, the sealed interface 55 prevents an air flow from passing between the top cover portion 54 and the top guide portion 36.

As illustrated in FIG. 9, the compressible assembly 24 is configured to form a seal in a direction parallel to a longitudinal axis 88 of the igniter 14, where the seal extends from the igniter housing base 26 to the opening 18 to prevent the air flow from passing between the igniter housing base 26 and the opening 18 and through the opening when the igniter 14 is either in the retracted position (FIG. 9) or the extended position (not shown). In addition to the compressible assembly 24 illustrated in FIG. 9, the igniter assembly 10 features a landing 23 positioned between the base 60 and the combustion liner 19 to form a sealed interface 15 around the opening 18.

The compressible assembly 24 is disposed between the igniter housing base 26 and the landing 23, and the compressible assembly 24 maintains a respective minimum contact level with the igniter housing base 26 and the landing 23 for a range of separations between the igniter housing 16 and the opening 18 sufficient to maintain the sealed interface 21 between the top guide portion 36 and the igniter housing base 26, a sealed interface 57 between the bottom base portion 62 and the landing 23, and the sealed interface 15 between the landing 23 and the combustion liner 19. The sealed interface 21 prevents air from passing between the igniter housing 16 and the top guide portion 36, into the igniter cavity 13 and through the opening 18. The sealed interface 57 prevents air from passing between the bottom base portion 62 and the landing 23 and entering the opening 18. The sealed interface 15 prevents air from passing between the landing 23 and the perimeter 28 of the opening 18 and into the opening 18.

As illustrated in FIG. 9, an opening 90 is provided in the igniter housing 16 to selectively supply an air flow into an igniter cavity 13 of the igniter housing 16 to purge the igniter cavity 13. The opening 90 may be selectively opened (using a controller or other control mechanism) to purge air from the igniter cavity 13, particularly when the temperature of the air within the igniter cavity 13 exceeds a predetermined threshold (which may be measured by a temperature sensor, for example). Thus, purging the igniter cavity 13 through the opening 90 provides some protection against thermal damage to the interior of the igniter cavity 13 and the igniter assembly 24 when the air temperature within the igniter cavity 13 reaches a high level.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. An igniter assembly of a gas turbine, comprising:

an igniter disposed within an igniter housing, said igniter being extendable from the igniter housing through an opening in a combustion liner to an extended position, said igniter being retractable from said extended position back through said opening to a retracted position;

a compressible assembly disposed between a base of said igniter housing and said combustion liner to form a sealed interface with a perimeter of said opening, said compressible assembly configured to restrict an air flow from passing between said igniter housing base and said perimeter of said opening;

a guide comprising a top portion and a bottom portion, said top portion comprising an outer flange configured to form a sealed interface with a base of said igniter housing, an upper longnitudinal portion configured to slidably engage an inner portion of said igniter housing, and a lower longitudinal portion, said bottom portion comprising a spring flange and a longitudinal portion;

a cover comprising a top portion and an outer portion, said top portion configured to slidably engage an outer surface of said longitudinal portion of said bottom guide portion and said lower longitudinal portion of said top guide portion;

a base comprising a bottom portion configured to form a sealed interface with said opening, and a longitudinal portion; and a spring;

wherein said spring flange, said outer cover portion, said bottom base portion and said longitudinal base portion are configured to form a variable reciprocating volume, said spring being disposed within said reciprocating volume to impart an upward force on said spring flange to effect a seal between said igniter housing base and said opening;

said compressible assembly being variable in length to accommodate a respective variation in a separation between said igniter housing base and said opening.

2. The igniter assembly of claim 1, wherein:

said spring flange is configured to contact a top end of said spring disposed within said reciprocating volume, said spring flange is configured to form a variable top portion of said reciprocating volume;

said longitudinal base portion is disposed between said spring and said longitudinal portion of said bottom guide portion to form an inner portion of said reciprocating volume;

said outer cover portion is configured to form an outer portion of said reciprocating volume, and said bottom base portion is configured to form a bottom portion of said reciprocating volume.

3. The igniter assembly of claim 2, wherein said spring flange is configured to vary the length of said spring to a maximum uncompressed length and the volume of said reciprocating volume to a maximum size for a maximum separation between said igniter housing base and said opening, said spring flange is configured to vary the length of said spring to a minimum compressed length and the volume of said reciprocating volume to a minimum size for a minimum separation between said igniter housing base and said opening.

4. The igniter assembly of claim 3, wherein for said maximum separation between said igniter housing base and said opening:

said top cover portion is slidably engaged with a lower portion along the outer surface of said longitudinal portion of said bottom guide portion and said lower longitudinal portion of said top guide portion, said lower portion positioned adjacent to said spring flange, said slidable engagement between said top cover portion and said lower portion is configured to form a sealed interface such that said air flow is prevented from passing between said top cover portion and said lower portion.

5. The igniter assembly of claim 3, wherein for said minimum separation between said igniter housing base and said opening:

said top cover portion is slidably engaged with an upper portion along the outer surface of said longitudinal portion of said bottom guide portion and said lower longitudinal portion of said top guide portion, said upper portion positioned adjacent to said outer flange, said slidable engagement between said top cover portion and said upper portion is configured to form a sealed interface such that said air flow is prevented from passing between said top cover portion and said upper portion.

6. The igniter assembly of claim 1, wherein said compressible assembly is configured to form a seal in a direction parallel to a longitudinal axis of said igniter, said seal being configured to extend from said igniter housing base to said opening to prevent said air flow from passing between said igniter housing base and said opening and through said opening when said igniter is in said retracted position.

7. The igniter assembly of claim 1, wherein a landing is configured to form a sealed interface around said opening, said compressible assembly is disposed between said igniter housing base and said landing, said compressible assembly is configured to maintain a respective minimum contact level with said igniter housing base and said landing sufficient to maintain a respective sealed interface with said igniter housing base and said landing to prevent said air flow from passing between said igniter housing base and said opening.

8. The igniter assembly of claim 7, wherein said compressible assembly is configured to maintain said respective minimum contact level with said igniter housing base and said landing for a range of said variation in said length of the compressible assembly based upon said variation in said separation between said igniter housing base and said opening.

9. The igniter assembly of claim 8, wherein said variation in said separation between said igniter housing base and said opening is based upon a relative motion between said igniter housing base and said landing, said relative motion being attributed to a disparity between a respective thermal expansion characteristic of said igniter housing base and said landing during a temperature variation of at least one of said igniter housing base and said landing.

10. The igniter assembly of claim 9, wherein said igniter assembly is spring-loaded, comprising at least one spring, said at least one spring being positioned within the variable reciprocating volume, said reciprocating volume and a compression distance of said at least one spring from an uncompressed length being simultaneously varied based upon said relative motion.

11. The igniter assembly of claim 10, wherein a base of said reciprocating volume forms said sealed interface with said landing, wherein a top portion of said reciprocating volume is configured to compress said compression distance of said at least one spring from said uncompressed length based upon said relative motion.

12. The igniter assembly of claim 1, further comprising an opening in said igniter housing to selectively supply an air flow into an igniter cavity of said igniter housing to purge the igniter cavity.

13. A seal assembly for sealing between an igniter housing and a combustion liner, the combustion liner having an opening for receiving an igniter extendable from said igniter housing through said opening to an extended position, said igniter being retractable from said extended position back through said opening to a retracted position, said seal assembly comprising:

a guide comprising a top portion and a bottom portion, said top portion comprising an outer flange configured to form a sealed interface with a base of said igniter housing, an upper longitudinal portion configured to slidably engage an inner portion of said igniter housing, and a lower longitudinal portion, said bottom portion comprising a spring flange and a longitudinal portion;

a cover comprising a top portion and an outer portion, said top portion configured to slidably engage an outer surface of said longitudinal portion of said guide bottom portion and said lower longitudinal portion of said guide top portion; and a base comprising a bottom portion configured to form a sealed interface with said opening, and a longitudinal portion;

a spring;

wherein said spring flange, said outer cover portion, said bottom base portion and said longitudinal base portion are configured to form a variable reciprocating volume, said spring being disposed within said reciprocating volume to impart an upward force on said spring flange to effect a seal between said igniter housing base and said opening.

14. The seal assembly of claim 13, wherein:

said spring flange is configured to contact a top end of said spring disposed within said reciprocating volume, said spring flange is configured to form a variable top portion of said reciprocating volume;

said longitudinal base portion is disposed between said spring and said longitudinal portion of said bottom guide portion to form an inner portion of said reciprocating volume;

said outer cover portion is configured to form an outer portion of said reciprocating volume, and said bottom base portion is configured to form a bottom portion of said reciprocating volume.

15. The igniter assembly of claim 14, wherein said spring flange is configured to vary the length of said spring to a maximum uncompressed length and the volume of said reciprocating volume to a maximum size for a maximum separation between said igniter housing base and said opening, said spring flange is configured to vary the length of said spring to a minimum compressed length and the volume of said reciprocating volume to a minimum size for a minimum separation between said igniter housing base and said opening.

16. The igniter assembly of claim 15, wherein for said maximum separation between said igniter housing base and said opening:

said top cover portion is slidably engaged with a lower portion along the outer surface of said longitudinal portion of said bottom guide portion and said lower longitudinal portion of said top guide portion, said lower portion positioned adjacent to said spring flange, said slidable engagement between said top cover portion and said lower portion is configured to form a sealed interface such that said air flow is prevented from passing between said top cover portion and said lower portion.

17. The igniter assembly of claim 15, wherein for said minimum separation between said igniter housing base and said opening:

said top cover portion is slidably engaged with an upper portion along the outer surface of said longitudinal portion of said bottom guide portion and said lower longitudinal portion of said top guide portion, said upper portion positioned adjacent to said outer flange, said slidable engagement between said top cover portion and said upper portion is configured to form a sealed interface such that said air flow is prevented from passing between said top cover portion and said upper portion.

18. A seal assembly for sealing between an igniter housing and a combustion liner, the combustion liner having an opening for receiving an igniter extendable from said igniter housing through said opening to an extended position, said igniter being retractable from said extended position back through said opening to a retracted position, said seal assembly comprising:

a guide element having an upper portion slidably engaged with an inside portion of said igniter housing, and a lower portion including a spring flange, said upper portion being welded to said lower portion;

a base element having an upper portion slidably disposed over said lower guide portion, and a lower portion configured to form a sealed interface with said opening;

a cover element disposed around the guide element and base element, said cover element being welded to said base element;

a spring;

wherein said cover element, said base element, and said spring flange are configured to form a variable reciprocating volume, said spring being disposed within said reciprocating volume to impart an upward force on said spring flange to urge said spring flange and said lower base portion apart to effect a seal between said igniter housing base and said opening.

* * * * *